United States Patent
Hsiung et al.

(10) Patent No.: US 7,529,319 B2
(45) Date of Patent: May 5, 2009

(54) SPEED ESTIMATION METHOD FOR TELECOMMUNICATION SYSTEM

(75) Inventors: Da-Wei Hsiung, Tainan (TW); Shun-An Yang, Changhua County (TW)

(73) Assignee: Mediatek Inc., Hsin-Chu (TW)

( * ) Notice: Subject to any disclaimer, the term of this patent is extended or adjusted under 35 U.S.C. 154(b) by 364 days.

(21) Appl. No.: 11/279,576

(22) Filed: Apr. 13, 2006

(65) Prior Publication Data

US 2007/0242760 A1    Oct. 18, 2007

(51) Int. Cl.
   *H04B 1/38* (2006.01)
(52) U.S. Cl. .................................... 375/319
(58) Field of Classification Search ............. 375/219, 375/316, 340, 343; 455/63.1, 506; 342/104
   See application file for complete search history.

(56) References Cited

U.S. PATENT DOCUMENTS

| | | | | |
|---|---|---|---|---|
| 5,586,148 A * | 12/1996 | Furukawa et al. | ............ | 375/340 |
| 5,943,132 A * | 8/1999 | Erskine | ............ | 356/484 |
| 6,230,107 B1 * | 5/2001 | Yamamoto et al. | ............ | 702/96 |
| 6,232,913 B1 * | 5/2001 | Lehtinen | ............ | 342/137 |
| 6,542,745 B1 | 4/2003 | Mottier et al. | ............ | 455/441 |
| 7,065,375 B2 * | 6/2006 | Bonhomme | ............ | 455/506 |
| 2006/0262883 A1 * | 11/2006 | Li et al. | ............ | 375/316 |

OTHER PUBLICATIONS

"On Generalized Covariance-Based Velocity Estimation" Anim-Appiah; 1999; pp. 1546-1557.
"Doppler Spread Estimation for Mobile OFDM Systems in Rayleigh Fading Channels" Cai et al.; 2003; pp. 973-977.

* cited by examiner

*Primary Examiner*—Chieh M Fan
*Assistant Examiner*—Jaison Joseph
(74) *Attorney, Agent, or Firm*—Thomas, Kayden, Horstemeyer & Risley

(57) ABSTRACT

A speed estimation method is provided, detecting relative speed of a transmitter and a receiver transmitting symbols by OFDM sub-carriers through a channel. First, a first correlation table is established, indicating conceptual relationships between the relative speed and the channel characteristic based on Doppler shift theory. Thereafter, channel characteristic caused by movement is estimated. The first correlation table is checked to determine the relative speed according to the estimated channel characteristic. The channel characteristic is a correlation value generated by auto-correlating received symbols with a delay factor. The first correlation table is established with a first delay factor, associating correlation values to a first plurality of presumed shift frequencies in view of the first delay factor. The first presumed shift frequencies scale from zero to a first maximum value, and the relative speed is proportional to the shift frequencies.

10 Claims, 7 Drawing Sheets

SPEED ESTIMATION METHOD FOR TELECOMMUNICATION SYSTEM

BACKGROUND OF THE INVENTION

1. Field of the Invention

The invention relates to OFDM telecommunications, and in particular, to a speed estimation method detecting relative speeds between a transmitter and a receiver transmitting symbols by OFDM sub-carriers through a channel.

2. Description of the Related Art

According to Orthogonal Frequency Division Multiplex (OFDM) standard, data is delivered separately through a plurality of sub-carriers with guard interval insertion, efficiently overcoming multi-path interference issues. In a mobile telecommunication system, such as wireless cellular network, a moving transmitter (or a receiver) is accommodated in a mobile station and the receiver (or the transmitter) is accommodated in a base station of a telecommunication system. A channel for mobile communication is challenged by time varying multi-path interferences. The channel response has a variation rate referred to as coherence time $T_c$. The coherence time $T_c$ is a period inversely proportional to Doppler shift frequency $f_d$ estimated between the transmitter and the receiver. Conventionally, the formula is provided as:

$$T_c = \frac{0.423}{f_d} \quad (1)$$

The higher the Doppler shift frequency, the shorter the coherence time. The Doppler shift frequency is also associated with the relative speed between the transmitter and receiver, proportional to the frequency of transmitted signal. Thus a formula is given as:

$$f_d = f_c \cdot \frac{v}{c} \quad (2)$$

Where c is the speed of light, and $f_c$ is the transmitted frequency. With formula (2), the relative speed v can be estimated since $f_c$ and c are known, and the $f_d$ is detectable.

As described in J. Cai, W. Song, and Z. Li, "Doppler Spread Estimation for Mobile OFDM Systems in Rayleigh Fading Channels," IEEE Tr. Consumer Electronics, vol. 49, issue 4, Nov. 2001, if a transmitter continuously sends a specific pattern while the channel varies with time, the receiver will obtain a correlation value by auto-correlating the received symbols based on a zero order Bessel function expressed as:

$$\phi(\Delta t) = J_0(2\pi f_d \Delta t) \quad (3)$$

Where the $\phi(\Delta t)$ is the correlation value corresponding to a delay time $\Delta t$. The delay time is a multiple of symbol time $T_s$:

$$\Delta t = mT_s \quad (4)$$

Thus, the correlation value $\phi(\Delta t)$ in formula (3) is also represented as:

$$\phi(m) = J_0(2\pi f_d m T_s) \quad (5)$$

Where $T_s$ represents the duration of one symbol time, and m is a positive integer.

Conventionally, speed estimation utilizes complex algorithm and hardware, which is deemed ineffective. To estimate relative speed while either the transmitter or the receiver is moving in communication, a more efficient method is desirable.

BRIEF SUMMARY OF THE INVENTION

A detailed description is given in the following embodiments with reference to the accompanying drawings.

An exemplary embodiment of a speed estimation method is provided, detecting relative speed of a transmitter and a receiver transmitting symbols by OFDM sub-carriers through a channel. First, a first correlation table is established, indicating conceptual relationships between the relative speed and the channel characteristic based on Doppler shift theory. Thereafter, channel characteristics caused by movement are estimated. The first correlation table is checked to determine the relative speed according to the estimated channel characteristic. The channel characteristic is a correlation value generated by auto-correlating received symbols with a delay factor. The first correlation table is established with a first delay factor, associating correlation values to a first plurality of presumed shift frequencies in view of the first delay factor. The first presumed shift frequencies scale from zero to a first maximum value, and the relative speed is proportional to the shift frequencies.

The establishment of the first correlation table comprises deriving a plurality of correlation curves corresponding to the first presumed shift frequencies based on Bessel function with the first presumed shift frequencies and delay factors as variables. The first delay factor is substituted to the plurality of correlation curves so that a plurality of correlation values are correspondingly obtained. The first delay factor is selected to render monotonic relationships between the obtained correlation values and the first presumed shift frequencies, by which associations of the obtained correlation values and the first presumed shift frequencies are recorded to form the first correlation table.

The determination of relative speed comprises auto-correlating received symbols with the first delay factor to generate a first correlation value. The first correlation table is checked to obtain an estimated shift frequency according to the first correlation value, and the relative speed is calculated by the estimated shift frequency. The first presumed shift frequencies are discontinuously selected from zero to the first maximum value with a first predetermined interval. If the first correlation value maps to a frequency between two presumed shift frequencies thereamong, the estimated frequency is determined by inner interpolation.

If the first correlation value maps to a frequency between zero and a least nonzero value among the first presumed frequencies, a second correlation table is established by a second delay factor higher than the first delay factor. The second correlation table associates correlation values to a second plurality of presumed shift frequencies in view of the second delay factor. The second presumed shift frequencies are discontinuously selected from zero to the least nonzero value with a second predetermined interval. The relative speed estimation is performed again with the second delay factor, such that a more accurate relative speed is obtained.

The auto-correlation of received symbols comprises a received symbol stream delayed by the delay factor to generate a delayed symbol stream. An expectation of the received symbol stream multiplying the delayed symbol stream is estimated. The expectation is normalized by power of the received symbol stream to generate the correlation value. Derivation of the plurality of correlation curves comprises providing a zero order Bessel function $\phi(m) = J_0(2\pi f_d m T_s)$, where $J_0$ is the zero order Bessel function, $f_d$ is the shift frequency, m is the delay factor, $T_s$ is the duration of a symbol time, and φ(m) is the correlation value associated with the delay factor. The correlation curves are plotted, where the horizontal axis represents the variation of delay factors m, and the vertical axis is the correlation value φ(m).

BRIEF DESCRIPTION OF THE DRAWINGS

The invention can be more fully understood by reading the subsequent detailed description and examples with references made to the accompanying drawings, wherein:

FIG. 1b shows a first lookup table generated from FIG. 1a;

FIG. 2b shows a second lookup table generated from FIG. 2a;

FIG. 3b shows a third lookup table generated from FIG. 3a; and

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
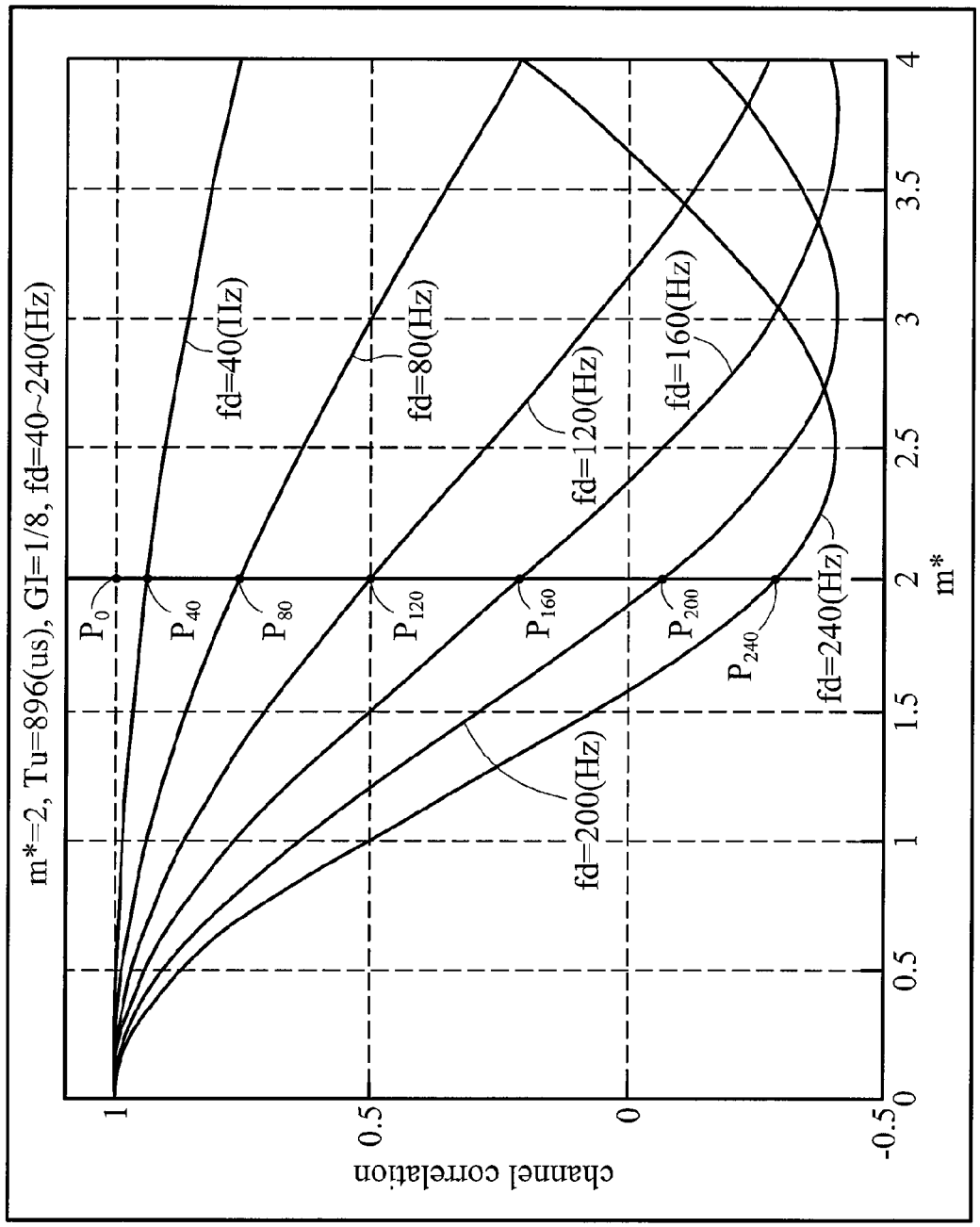
FIG. 1a shows correlation curves of a large scale shift frequencies.

FIG. 1a shows correlation curves of a large scale shift frequencies. In the embodiments, correlation tables are established, such that the relative speed can be easily estimated by looking up the tables according to observable channel characteristics. FIG. 1a shows seven correlation curves of shift frequencies $f_d$ from 0 Hz to 240 Hz incrementing every 40 Hz. As defined in DVB-T system, sub-carrier number, symbol time $T_s$ and guard interval size GI vary as different transfer rate. The symbol time $T_s$ can be derived from the guard interval size GI and data duration $T_u$:

$$T_s = T_U(1+GI) \quad (6)$$

For example, if the guard interval size GI is chosen to be ⅛ in 8K mode, the correlation curves can be plotted based on formula (5), with horizontal axis representing the delay factor m, and the vertical axis the correlation value Φ(m). These correlation curves, each representing a presumed shift frequency, show theoretical relationships between the relative speed and the auto-correlation results of the received symbols based on Doppler shift theory. In FIG. 1a, if a vertical line corresponding to a fixed delay factor m is drawn crossing the correlation curves, a plurality of cross points are generated, mapping to corresponding correlation values If the delay factor m is carefully chosen, the mapped correlation values may have monotonic relationships with the presumed shift speeds represented by the correlation curves. In FIG. 1a, the monotonic relationship is available before the delay factor m reaches first cross point of the 200 Hz and 240 Hz curves. By way of explanation, using the vertical line of m=2, correlation value at 0 Hz is 1, and gradually decreases as the shift frequency increases. Subsequently, the correlation curves of 200 Hz and 240 Hz map to negative correlation values at m=2. That is to say, by selecting a proper delay factor m, a monotonic linear relationship can be found between the shift frequencies and the correlation values.

Figure 1B:
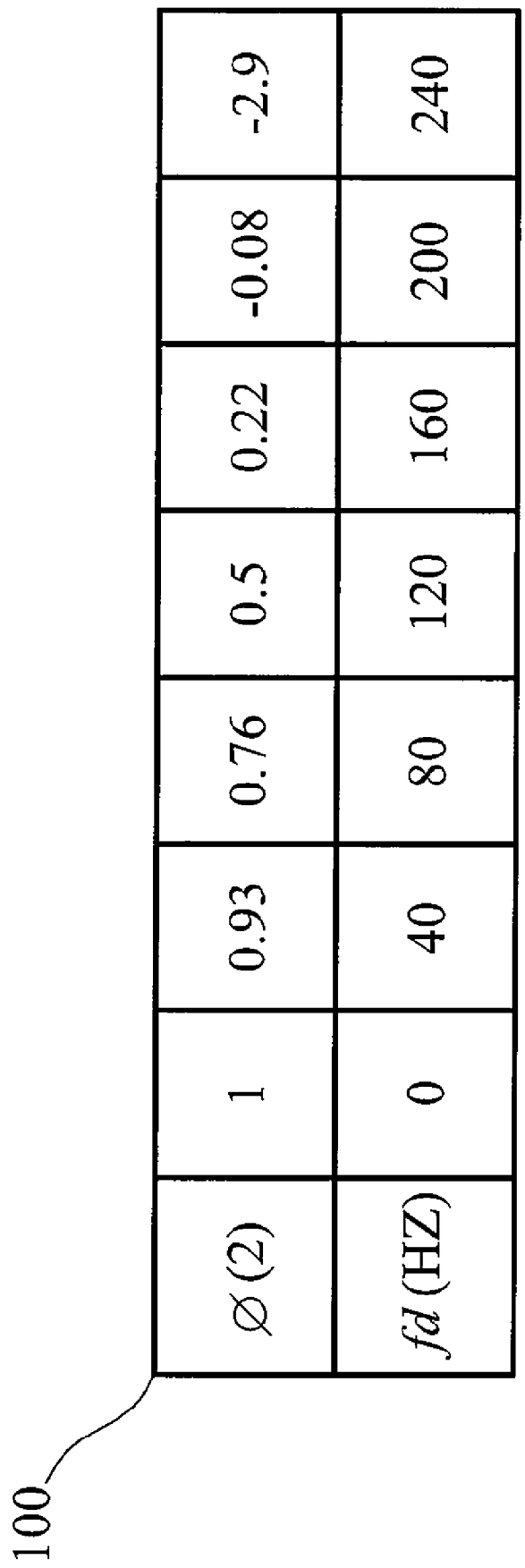

FIG. 1b shows a first lookup table 100 generated from FIG. 1a. In this case, the delay factor is chosen to be 2, thus a plurality of cross points P0 to P240 are obtained, each associating a theoretical correlation value to a shift frequency, and the first lookup table 100 is established thereby.

When a transmitter delivers a specific pattern while moving with a relative speed, the receiver may obtain an estimated correlation value by auto-correlating the received symbols. The auto-correlation can be easily implemented by an adder, a multiplier and a delay line. The delay line delays the received symbol by a delay factor m to generate the estimated correlation value. Since the shift frequencies are linear to the correlation values with regards to the delay factor m, an estimated shift frequency $f_d$ can be easily obtained by interpolation of the cross points P0 to P240, and the relative speed v can be estimated by formula (2) from the $f_d$.

Figure 2A:
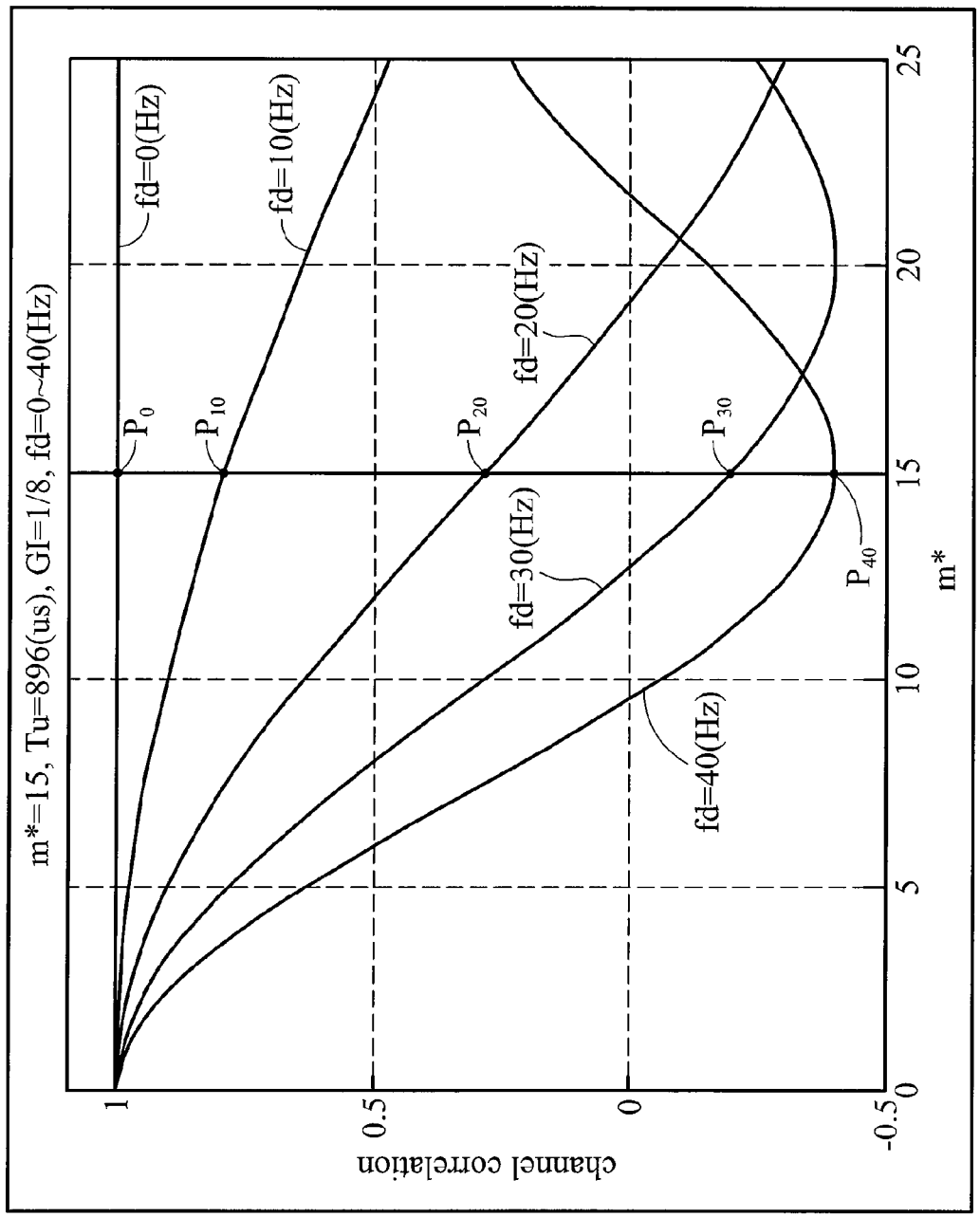
FIG. 2a shows correlation curves of a medium scale shift frequencies.
Figure 2B:
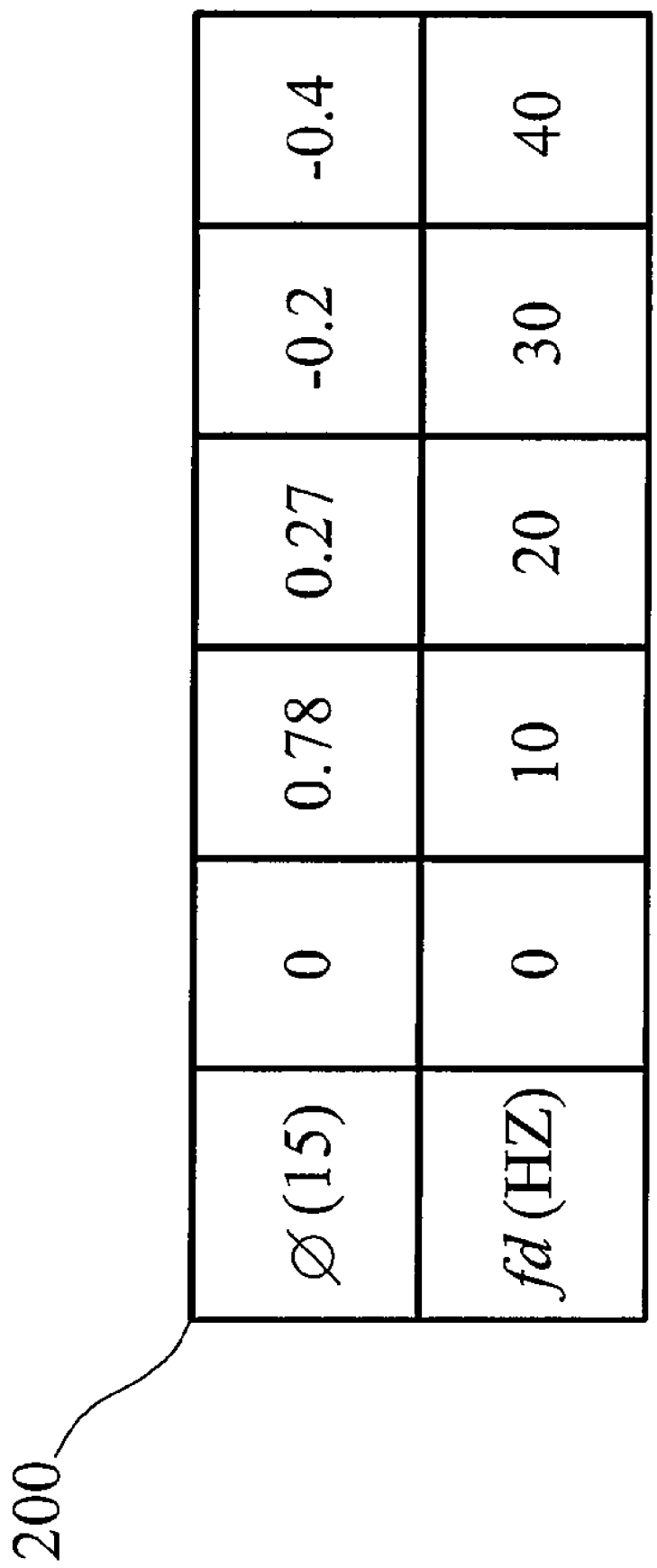

FIG. 2a shows five correlation curves scaling from 0 Hz to 40 Hz incrementing by 10 Hz. A second lookup table 200 can be established to distinguish more detailed shift frequencies between 0 Hz and 40 Hz as shown in FIG. 2b. When the shift frequency is below 40 Hz, the second lookup table 200 provides better distinguishability than the first lookup table 100. Another delay factor m is chosen within the monotonic range to establish the second lookup table 200. For example, in FIG. 2a, cross points obtained on vertical line m=15 have better distinguishability than those on m=10. On the contrary, points appear on the correlation curves where m=20 are not monotonic with the correlation values, thus a method to select the delay factor m is desirable. As an example, the correlation curve of maximum shift frequency (40 Hz in FIG. 2a) is observed to determine the delay factor m for establishment of the second lookup table 200. On the 40 Hz curve, correlation value decreases as the delay factor m increases (within a preliminary range). When the correlation value reaches zero, the corresponding delay factor m is chosen to obtain a plurality of cross points from all correlation curves to establish the second lookup table 200. Alternatively selection of the delay factor m can comprise, when the 40 Hz curve has a turning point where the slope is zero, the delay factor m thereof selected for use. The delay factor m should be an integer, thus the closest integer is selected from the described methods. In FIG. 2a, the delay factor is chosen to be 15 to have best distinguishability, and the second lookup table 200 associating cross points P0 to P40 to corresponding correlation values, is established thereby.

Figure 3A:
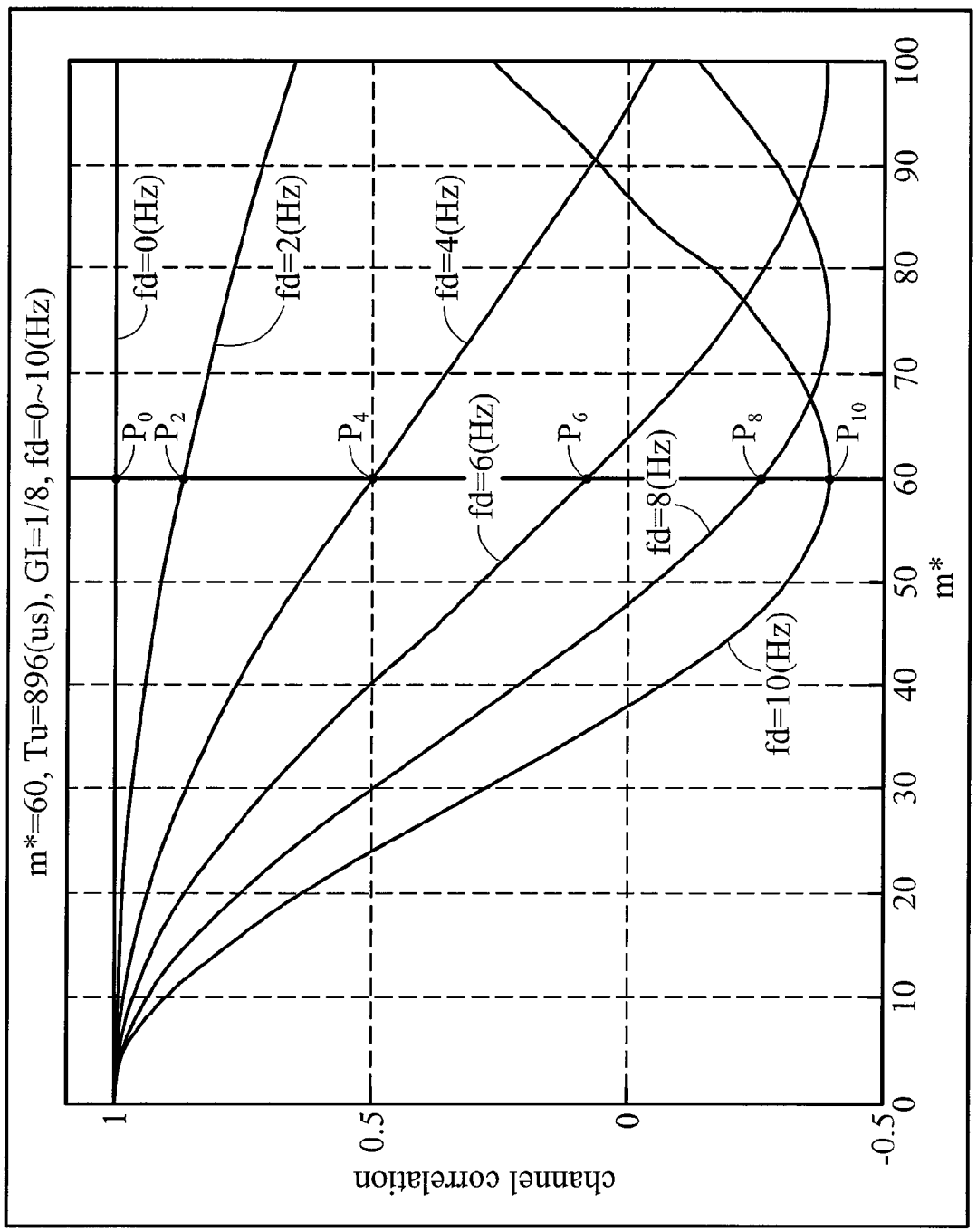
FIG. 3a shows correlation curves of a least scale shift frequencies.
Figure 3B:
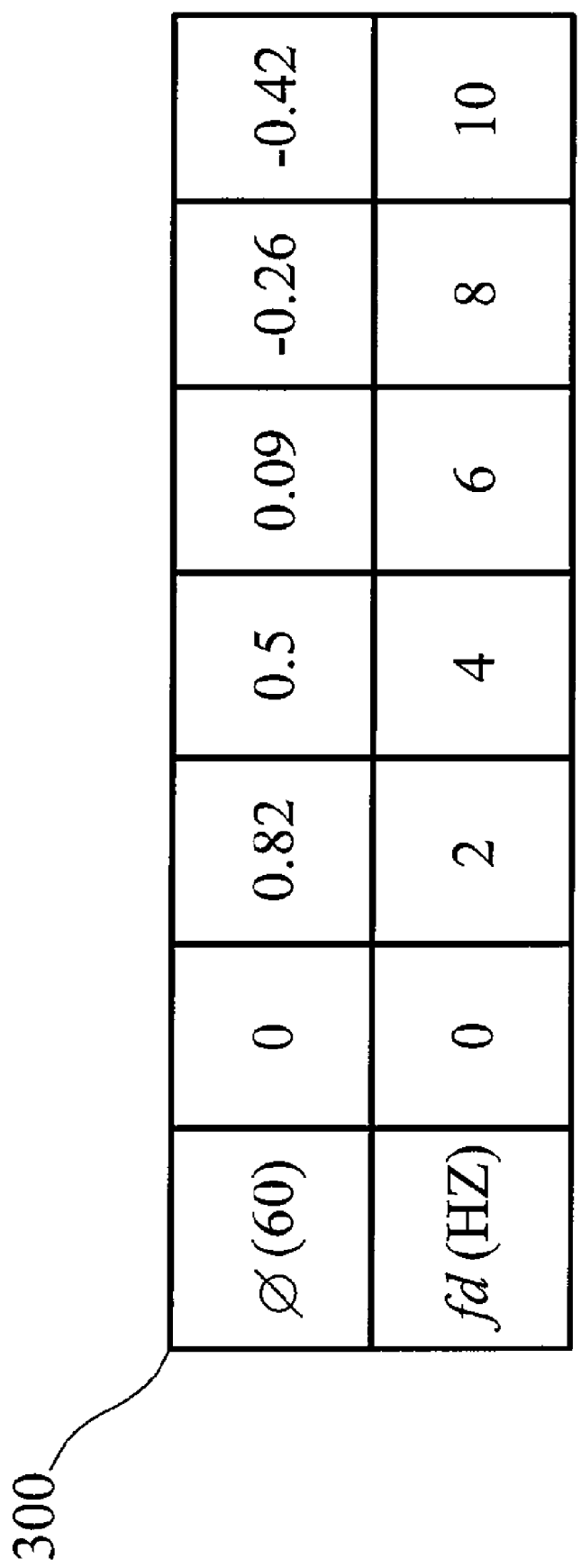

FIG. 3a shows six correlation curves scaling from 0 Hz to 10 Hz incrementing by 2 Hz. The cross points P0 to P10 mapped by setting the delay factor m to 60, generate a third lookup table 300 as shown in FIG. 3b. When the shift frequency is below 10 Hz, the third lookup table 300 has better distinguishability in comparison to the first and second lookup tables.

The auto-correlation of received symbols can be implemented by a delay line, a multiplier and an adder. For example, the correlation value of delay factor m=2 is:

$$\phi(2) = \frac{E\{r[n] \cdot r[n-2]\}}{E\{r[n] \cdot r[n]\}} \quad (7)$$

Where r[n] is a received symbol stream, and r[n−2] is generated by delaying the received symbol stream r[n] by two symbol times. The r[n] and r[n−2] are multiplied to take expectation. The denominator term normalizes the expectation. The received symbol stream r[n], however, may be affected by noise, inducing erroneous correlation values. In practice, the received symbol stream r[n] may be expressed as:

$$r[n]=s[n]+i[n] \qquad (8)$$

Where the s[n] is the original signal sent from the transmitter, and i[n] is noise. If i[n] is additive white Gaussian noise (AWGN), the correlation value in formula (7) is rewritten as:

$$\phi(2) = \frac{E\{r[n] \cdot r[n-2]\}}{E\{s[n] \cdot s[n]\} + E\{i[n] \cdot i[n]\}} \qquad (9)$$

To cancel the erroneous term in the denominator of formula (9), an alternative correlation term is defined by:

$$\varphi(m,1) = \frac{\phi(m)}{\phi(1)} = \frac{E\{r[n] \cdot r[n-m]\}}{E\{r[n] \cdot r[n-1]\}} \qquad (10)$$

Thus, an alternative correlation term can also be associated with the Bessel function to plot alternative conceptual correlation curves (not shown):

$$\varphi(m,1) = \frac{J_0(2\pi f_d m T_s)}{J_0(2\pi f_d T_s)} \qquad (11)$$

Similarly, a plurality of correlation curves may be generated by substituting various shift frequencies $f_d$ to formula (11) to map relationships of correlation value φ(m,1) versus delay factor m.

Figure 4:
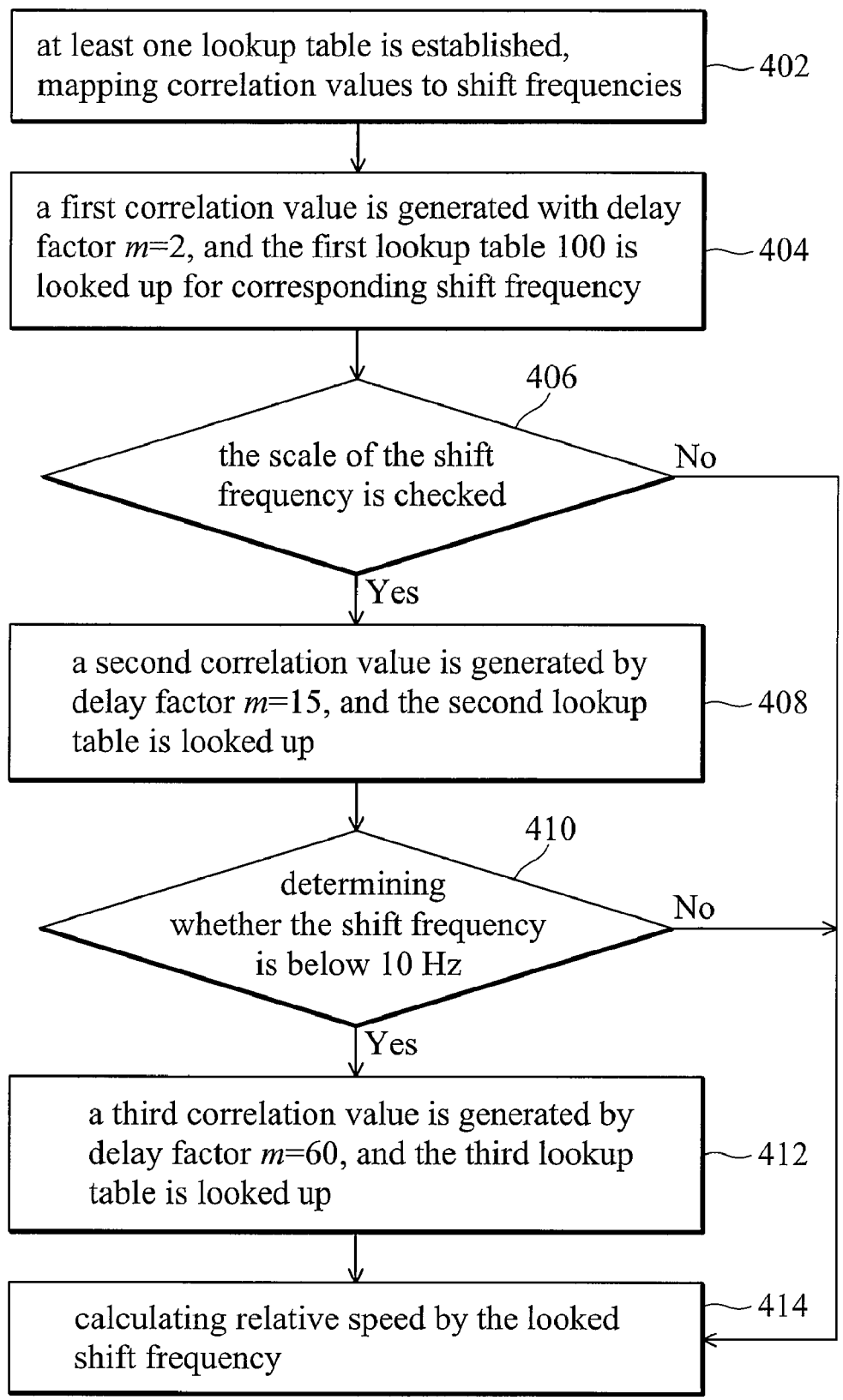
FIG. 4 is a flowchart of the speed estimation method.

FIG. 4 is a flowchart of the speed estimation method. In step 402, at least one lookup table is established, mapping correlation values to shift frequencies. The scale of shift frequency depends on practical applications, and different lookup tables may be generated by different delay factor to map different scale shift frequencies. In FIGS. 1b, 2b and 2c, three lookup tables are established to specifically map three different scales. In step 404, a first correlation value is generated with delay factor m=2, and the first lookup table 100 is checked for corresponding shift frequency. Values between two columns can be obtained by interpolation. In step 406, the scale of the shift frequency is checked. If the shift frequency is below 40 Hz, step 408 is processed. Otherwise, a relative speed is calculated in step 414 by the checked shift frequency. In step 408, a second correlation value is generated by delay factor m=15, and the second lookup table is checked. Step 410 determines whether the shift frequency is below 10 Hz, and if so, step 412 is processed. Otherwise the relative speed is estimated in step 414. In step 412, a third correlation value is generated by delay factor m=60, and the third lookup table is checked, estimating a shift frequency scaling from 0 Hz to 10 Hz. Thereafter, step 414 is processed.

For each lookup table, the number of correlation curves and incremental intervals are not limited by the embodiments. The determination of delay factor m may take various forms. Number of lookup tables depends on practical accuracy requirements, and the scale thereof is also dependent. The generation of relation curves is not limited to Bessel function, and may be adaptable for other algorithms. The speed estimation method is applicable for telecommunication systems utilizing OFDM such as DVB-T, GSM or IEEE 802.11a/b/g standards.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A speed estimation method, for detecting relative speed of a transmitter and a receiver transmitting symbols by OFDM sub-carriers through a channel, comprising:

establishing a first correlation table indicating first conceptual relationships between relative speeds and channel characteristics based on Doppler shift theory and a first delay factor;

establishing a second correlation table indicating second conceptual relationships between relative speeds and channel characteristics based on Doppler shift theory and a second delay factor; wherein the second conceptual relationships present a lesser scale and a higher distinguish ability than that of the first conceptual relationships;

estimating a first channel characteristic based on the first delay factor caused by the a relative movement of the transmitter and the receiver;

looking up the first correlation table to determine the relative speed according to the first channel characteristic; and if the first channel characteristic is lower than a least item in the first correlation table, estimating a second channel characteristic based on the second delay factor and looking up the second correlation table based on the second channel characteristic to determine the relative speed.

2. The speed estimation method as claimed in claim 1, wherein:

the channel characteristics are variable correlation values generated by auto-correlating received symbols with variable delay factors;

establishment of the first correlation table comprises obtaining correlation values associated to a first plurality of presumed shift frequencies in the control of the first delay factor;

the first presumed shift frequencies scale from zero to a first maximum value; and the relative speed is proportional to the shift frequencies.

3. The speed estimation method as claimed in claim 2, wherein the establishment of the first correlation table further comprises:

deriving a plurality of correlation curves corresponding to the first presumed shift frequencies based on Bessel function with the first presumed shift frequencies and variable delay factors;

substituting the first delay factor to the plurality of correlation curves so that a plurality of correlation values are obtained correspondingly, wherein the first delay factor is selected to render monotonic relationships between the obtained correlation values and the first presumed shift frequencies; and characteristics is generated and the second correlation table is looked up; and established of the second correlation table copmprises obtaining correlation values associated to a second plurality of persumed shift frequencies in the control of the second delay factor, wherein the second persumed shift predetermined interval are discontinuously selected from zero to the least nonzereo value with the second predetermined interval.

4. The speed estimation method as claimed in claim 1, wherein:
the step of estimating the first channel characteristic comprises auto-correlating received symbols with the first delay factor to generate a first correlation value; and
the step of looking up the first correlation table comprises:
checking the first correlation table to obtain an estimated shift frequency according to the first correlation value; and
calculating the relative speed by the estimated shift frequency.

5. The speed estimation method as claimed in claim 2, wherein:
the first presumed shift frequencies are discontinuously selected from zero to the first maximum value with a first predetermined interval; and
if the first correlation value maps to a frequency between two presumed shift frequencies thereamong, the estimated frequency is determined by inner interpolation.

6. The speed estimation method as claimed in claim 5, wherein:
if the first correlation value maps to a frequency between zero and a least nonzero value among the first presumed frequencies, the second channel characteristic is generated and the second correlation table is looked up; and
establishment of the second correlation table comprises obtaining correlation values associated to a second plurality of presumed shift frequencies in the control of the second delay factor, wherein the second presumed shift frequencies are discontinuously selected from zero to the least nonzero value with a second predetermined interval.

7. The speed estimation method as claimed in claim 3, wherein the auto-correlation of received symbols comprises:
delaying a received symbol stream according to a delay factor to generate a delayed symbol stream;
estimating an expectation of the received symbol stream multiplying the delayed symbol stream; and
normalizing the expectation by power of the received symbol stream to generate a correlation value.

8. The speed estimation method as claimed in claim 7, wherein derivation of the plurality of correlation curves comprises:
providing a zero order Bessel function expressed as:

$$\phi(m)=J_0(2\pi f_d m T_s)$$

where $J^0$ is the zero order Bessel function, $f_d$ is the shift frequency, m is a variable delay factor, $T_s$ is the duration of a symbol time, and $\phi(m)$ is a correlation value associated with the variable delay factor; and
plotting the correlation curves where the horizontal axis represents the variation of delay factors m, and the vertical axis is the correlation value $\phi(m)$.

9. The speed estimation method as claimed in claim 2, wherein the auto-correlation of received symbols comprises:
delaying a received symbol stream by one symbol time to generate a first delayed symbol stream;
estimating a first expectation of the received symbol stream multiplying the first delayed symbol stream;
delaying the received symbol stream according to a delay factor to generate a second delayed symbol stream;
estimating a second expectation of the received symbol stream multiplying the second delayed symbol stream; and
dividing the second expectation by the first expectation to generate a correlation value.

10. The speed estimation method as claimed in claim 9, wherein derivation of the plurality of correlation curves comprises:
providing a zero order Bessel function expressed as follows:

$$\phi(m)=J_0(2\pi f_d m T_s)$$

where $J^0$ is the zero order Bessel function, $f_d$ is the shift frequency, m is a variable delay factor, $T_s$ is the duration of a symbol time, and $\phi(m)$ is the correlation value associated with the variable delay factor; and
plotting the correlation curves where the horizontal axis represents the variation of delay factors, and the vertical axis is the correlation value $\phi(m)/\phi(1)$.

* * * * *